United States Patent

[11] 3,584,262

[72] Inventor Wardell Gary
Beaver, Pa.
[21] Appl. No. 732,631
[22] Filed May 28, 1968
[45] Patented June 8, 1971
[73] Assignee Westinghouse Electric Corporation
Pittsburgh, Pa.

[54] SOLID-STATE ON DELAY TIME DELAY APPARATUS
12 Claims, 1 Drawing Fig.

[52] U.S. Cl. .......... 317/141, 307/293, 317/148.5
[51] Int. Cl. .......... H01h 47/18, H01h 47/32
[50] Field of Search .......... 317/148.5, 142, 148.5 B; 307/293, 301

[56] References Cited

UNITED STATES PATENTS

| | | | |
|---|---|---|---|
| 3,250,891 | 5/1966 | Pease .......... | 219/113 |
| 3,486,041 | 12/1969 | Thompson .......... | 307/252 |
| 3,210,605 | 10/1965 | Jones .......... | 317/33 |
| 3,146,392 | 8/1964 | Sylvan .......... | 323/22 |
| 3,355,632 | 11/1967 | Wallentowitz .......... | 317/142 |
| 3,478,250 | 11/1969 | Zocholl et al. .......... | 317/33 |
| 3,414,766 | 12/1968 | Miller .......... | 315/194 |

*Primary Examiner*—Lee T. Hix
*Assistant Examiner*—C. L. Yates
*Attorneys*—A. T. Stratton, C. L. McHale and M. I. Hull

ABSTRACT: A time delay trigger circuit which does not require a well regulated direct current supply voltage for accurate and reliable timing and does not cause heavy loading on the direct current supply prior to timing out still supplies ample trigger current to a controlled rectifier by diverting current which normally flows through a direct current regulator diode into the gate of the controlled rectifier. The controlled rectifier is maintained in a conducting state by using two "latching" resistors to provide a pulsating direct current load with a 90 electrical degree phase difference with the relay coil current, so that current through the controlled rectifier never decreases below its holding current until the line voltage is interrupted. After the circuit times out and the direct current supply diminishes, positive pulses are applied to the negative end of the timing capacitor, discharging the capacitor to zero voltage level so that the circuit will have an extremely short reset time after the timing cycle is completed.

PATENTED JUN 8 1971 3,584,262
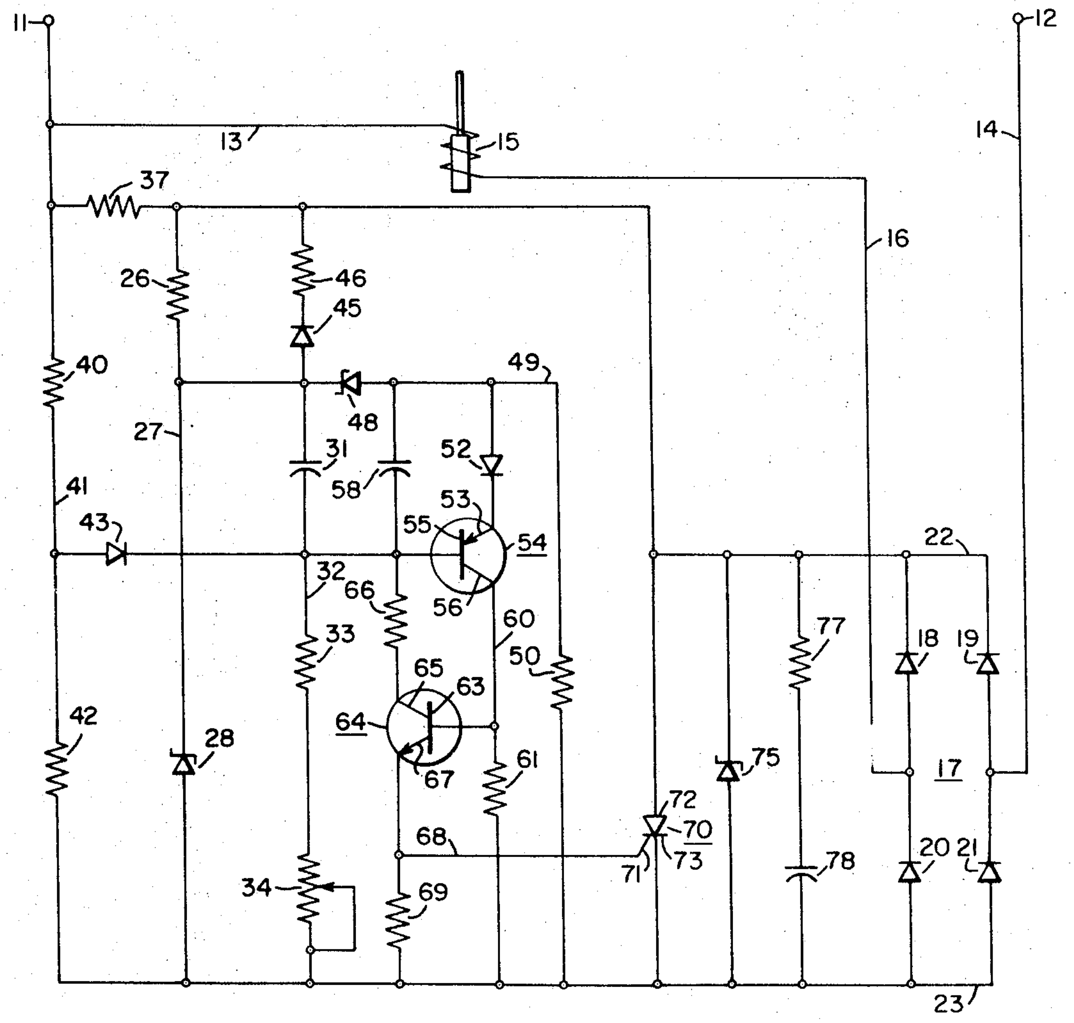
WITNESSES:
INVENTOR
Wardell Gary
BY
ATTORNEY

SOLID-STATE ON DELAY TIME DELAY APPARATUS

CROSS-REFERENCES TO RELATED APPLICATIONS

This application is related to the following copending applications: Watson, "Off Delay Apparatus," Ser. No. 625,762, filed Mar. 24, 1967; Watson, "Internally Generated Auxiliary Direct Current Voltage Source For A Controlled Rectifier Switch," Ser. No. 735,226, filed June 7, 1968; Thompson et al., "Small Transformerless Solid-State On Delay Timer," Ser. No. 732,721, filed May 28, 1968; Gary, "Off Delay Solid State Time Delay Apparatus," Ser. No. 732,720, filed May 28, 1968, and Thompson, "Semiconductor Time Delay Circuits," Ser. No. 571,613, filed Aug. 10, 1966, all assigned to the assignee of the instant invention.

BACKGROUND OF THE INVENTION

1. Field of the Invention

The invention relates to time delay circuits and particularly to a time delayed interlock for use with contactor apparatus.

2. Description of the Prior Art

Timing circuits using the time constant of an R-C combination are old in the art and have been used heretofore in applications similar to that of the instant invention.

Prior art devices did not meet the requirements of apparatus embodying the instant invention, which was required not to exceed a predetermined volume, that it should provide sufficient current to energize a certain contact coil, that the timer should be inexpensive yet reliable and accurate, that the timer should be completely solid state that if the input voltage is interrupted prior to a timing out, the circuit should not energize the output but reset to zero, that accurate timing should be obtained without requiring a well regulated direct current supply.

The prior art is exemplified by the following U.S. Pat. Nos. 3,045,150; 3,365,586; 3,197,656; 3,047,745; 3,162,772; 3,158,757; 3,267,289; 2,845,548; 3,132,261; 3,099,758; 3,202,884.

SUMMARY OF THE INVENTION

Apparatus of the invention provides a time delay trigger circuit which does not require a well regulated direct current supply voltage for accurate and reliable timing; the time delay trigger circuit does not cause heavy loading on the direct current supply prior to timing out (so that a *dv/dt* suppressor capacitor can also be used as a filter capacitor) and still supply ample trigger current to a controlled rectifier by diverting the current through a direct current regulator diode into the gate of the the controlled rectifier; maintaining the controlled rectifier in the conducting state by using two "latching" resistors to provide a pulsating direct current load with a 90 electrical degree phase shift with the contact or relay coil current, so that the current through the controlled rectifier never decreases below its holding current until the line voltage is interrupted; after the circuit times out and the direct current supply diminishes applying positive pulses to the negative end of the timing capacitor, discharging the capacitor to zero voltage level so that the circuit will have an extremely short reset time after the timing cycle is completed; and other novel features.

BRIEF DESCRIPTION OF THE DRAWING

The single FIGURE of the drawing is a schematic electrical circuit diagram according to the preferred embodiment of my invention.

DESCRIPTION OF THE PREFERRED EMBODIMENT

Input terminals 11 and 12 have an alternating current voltage, for example 120 volts applied thereacross, and are connected by leads 13 and 14, contactor or relay coil 15, and lead 16 to a full-wave rectifier generally designated 17. The full-wave rectifier 17 is shown to include rectifier 18 through 21 connected to supply an output across leads 22 and 23, lead 22 being positive and lead 23 negative.

Connected between leads 22 and 23 are, in series, resistor 26, lead 27 and Zener diode 28. The Zener diode 28 clamps the voltage on lead 27 at a certain level, in this case 15 volts. Whereas the last-named direct current voltage on lead 27 may familiarly be referred to as the supply voltage in the art, it will be referred to herein as the timing voltage to distinguish it from the direct current supply voltage from the aforementioned full-wave rectifier.

The R-C timing circuit includes the series connected capacitor 31, lead 32, resistor 33 and variable resistor 34 which is made manually adjustable.

The rectifiers 18 through 21 inclusive may be of a type known in the trade as 1N822; resistor 26 may have a value of 18 kilohms, hereinafter abbreviated K.; the diode 28 may be of a type known in the trade as 1N965B; capacitor 31 may have a value of 5.6 microfarads, hereinafter abbreviated MF., resistor 33 may have a value of 15 K. and resistor 34 may have a maximum value of 5 megohms, hereinafter abbreviated meg. Resistor 37, which may have a value of 22 K., connects lead 22 to the aforementioned lead 13. Lead 13 is further connected by way of resistor 40, lead 41 and resistor 42 to the aforementioned lead 23. Resistor 40 may have a value of 22 K. and resistor 42 may have a value of 150 ohms. Diode 43 interconnects lead 41 with the aforementioned lead 32. Diode 43 may be a type known in the trade as 1N457. The aforementioned lead 27 is also connected by way of diode 45 and resistor 46 to the aforementioned lead 22. Diode 45 may be of a type known in the trade as 1N645 and resistor 46 may have a value of 470 ohms.

The aforementioned lead 27 and the junction between capacitor 31 and diode 45 is also connected by way of Zener diode 48, lead 49 and resistor 50 to the aforementioned lead 23. Zener diode 48 has a voltage rating of 8.2 volts and may be a type known in the trade as a 1N959B, and resistor 50 may have a value of 27 K. The aforementioned lead 49 is connected by way of diode 52, which may be a type known in the trade as 1N457, to the emitter 53 of a PNP transistor generally designated 54 having a base 55 and a collector 56. The base 55 is connected to the aforementioned lead 32. Base 55 is also connected by way of capacitor 58 to the aforementioned lead 49. Capacitor 58 may have a value of 0.01 microfarads, and transistor generally designated 54 may be a type known in the trade as 2N3638. The aforementioned collector 56 is connected by way of lead 60 and resistor 61 to the aforementioned lead 23. Resistor 61 may have a value of 120 K. Lead 60 is also connected to the base 63 of an NPN transistor generally designated 64 having the collector 65 thereof connected by way of resistor 66 to the aforementioned lead 32 and having the emitter 67 thereof connected by way of lead 68 and resistor 69 to the aforementioned lead 23. Transistor 64 may be of a type known in the trade as a 2N1711. Resistor 66 may have a value of 4.7 K. and resistor 69 may have a value of 390 ohms.

The aforementioned lead 68 is connected to the control element of a controlled rectifier generally designated 70 having in addition to the control element 71 an anode 72 and cathode 73. Element 73 is directly connected to lead 23 and element 72 is directly connected to lead 22. The controlled rectifier 70 may be of a type known in the trade as C106B1.

Connected between the aforementioned leads 22 and 23 is an additional Zener diode 75 which may be of a type known in the trade as 1N3051B, which is provided to protect the controlled rectifier from high voltage transients, and connected in shunt with the last-named Zener diode are a series-connected resistor 77 and capacitor 78. Resistor 77 may have a value of 15 ohms and capacitor 78 may have a value of 0.022 microfarads.

In the instant circuit the controlled rectifier generally designated 70 is "open," and after a voltage has been applied to lead 27 for a certain period of time, the controlled rectifier is switched on.

The operation of the circuit will first be described with reference to its quiescent state when capacitor 31 is uncharged.

When voltage is first applied to the timing circuit by connecting terminals 11 and 12 to an alternating current line, that is, applied to lead 27 and across Zener diode 28, capacitor 31 is uncharged and the voltage appearing on the base 55 of transistor 54 is the full-wave rectified DC timing voltage on lead 27. The emitter 53 of transistor 54 is held to a lower voltage than the DC timing voltage by the voltage drop on Zener diode 48. The complementary pair of transistors 54 and 64 cannot conduct and supply trigger current to the gate element 71 of the controlled rectifier generally designated 70. The controlled rectifier does not conduct and the circuit therethrough remains "open." The initially uncharged timing capacitor 31 commences to charge toward the timing voltage on lead 27 through the resistors 33 and 34; the values of resistance together with the capacitance determine the time delay period. When the voltage on the timing capacitor 31 is equal to the threshold voltage, as determined by the Zener diode 48 and the forward voltage drops of diode 52 and the emitter-base junction of transistor 54, the complementary pair of transistors switches on and conducts trigger current by way of lead 68 to the gate of the controlled rectifier, which may be a silicon controlled rectifier. The SCR conducts thereby "closing" the output contacts.

The aforementioned timing capacitor 31 is connected from the positive terminal of the DC timing voltage to the base 55 of transistor 54, and a Zener diode 48, rather than the resistor divider, is used to determine the threshold voltage of the complementary pair of transistors to prevent the threshold voltage from varying as ripple is introduced into timing circuit supply voltage across diode 28. Ripple is introduced when the full-wave rectified voltage across the output decreases below the Zener voltage of Zener diode 28 each 1/120 of a second. Regardless of the amount of voltage on the timing circuit, the complementary pair of transistors cannot conduct until the voltage on capacitor 31 is equal to the Zener voltage of Zener diode 48 plus the forward voltage drop of diode 52 and the emitter-base junction of transistor 54. This enables the circuit to produce an accurate and reliable time delay without a well regulated timing circuit supply voltage.

Prior to timing out, that is, completing the timing period and turning on the controlled rectifier 70, the voltage divider formed by Zener diode 48 and resistor 50 acts as a voltage sensitive resistor which varies inversely with voltage. When the DC voltage decreases below the Zener voltage of Zener diode 28, the loading on the DC supply is reduced due to the effective increasing resistance with decreasing direct current supply voltage. Resetting of capacitor 31 does not occur until the DC supply voltage across diode 28 is less than the instantaneous value of the voltage on capacitor 31. The maximum voltage ever obtained by capacitor 31 prior to timing out is the threshold voltage of the complementary pair of transistors which is approximately 9 volts.

A *dv/dt* suppressor capacitor 78 of 0.022 microfarads supplies a minimum direct current voltage of 12 volts to the timing circuit when the full-wave rectifier direct current voltage on the output bridge goes to zero each 1/120 second. Thus, the *dv/dt* suppressor capacitor 78 can also be used as the direct current supply filter capacitor.

Although the time delay trigger circuit does not cause heavy loading on the direct current supply across the rectifier bridge prior to timing out, ample triggering current is supplied to the controlled rectifier by diverting the current through Zener diode 28 into the gate element 71 of controlled rectifier 70 after the circuit times out. When the complementary pair of transistors switches on, the voltage on Zener diode 28 drops to a value equal to the Zener voltage of Zener diode 48 plus the voltage drop across diode 52 and transistors 54 and 64. This value is below the Zener voltage of Zener diode 28. Zener diode 28 cannot conduct and the current through resistor 26 flows through Zener diode 48, diode 52, transistor 54, transistor 64 and into the gate 71 of the controlled rectifier generally designated 70. As previously stated, one of the problems solved by the circuit of my invention is related to a phase shifted holding current circuit. Since the direct current voltage across the anode-cathode of controlled rectifier 70 diminishes when the circuit through the anode-cathode "-closes" and continuous gate trigger current cannot be supplied, the controlled rectifier will revert to its blocking state when the load current through the contactor coil 15 decreases to zero unless some means of maintaining the controlled rectifier in conduction is provided. The means which I provide for accomplishing this are the two latching resistors 37 and 40 to provide holding current from the alternating current line connected at terminals 11 and 12. Resistors 37 and 40 conduct alternating current when the output through the silicon controlled rectifier is closed. Alternate half cycles of this current through these resistors flow through the silicon controlled rectifier. This resistive load is approximately 90 electrical degrees out of phase with the current through the contactor coil. The current through the controlled rectifier does not go to zero until the line voltage is interrupted. Thus, the controlled rectifier is maintained in conduction by this phase-shifted pulsating direct current.

As previously stated, if the line voltage across the input terminals is interrupted prior to timing out, the timing capacitor 31 is reset to zero charge. This is accomplished through resistor 26, resistor 46, diode 45, resistors 37 and 40, and diode 43. Diode 43 is used to effectively short the timing resistors 33 and 34 during the resetting process. Capacitor 31 discharges to approximately 0.5 volts through diode 43. The maximum time required for capacitor 31 to discharge to 0.5 volts is 2 seconds. The resetting process is contained through resistors 42, 34 and 33. The time required to reset to zero is dependent upon the amount of timing resistance in the circuit.

Since the threshold switching voltage of the complementary pair of transistors 54 and 64 does not vary with a variation in the direct current supply voltage, the preliminary firing phenomenon is not present.

After the circuit times out and the output contact closes, the capacitor 31 has a much more rapid discharge path through resistor 26, resistor 46 and diode 45, controlled rectifier 70, resistor 42 and diode 43. Resistor 42 causes positive pulses to be applied to the anode of diode 43 so that capacitor 31 resets much closer to zero voltage than the forward voltage drops across the controlled rectifier and diode 43. If the line voltage is interrupted 0.1 second or more after the circuit has timed out, capacitor 31 has reset to a sufficient level to give less than plus or minus 2 percent timing variation with a reset time of 8 milliseconds.

The Zener diode 75 as aforementioned protects the controlled rectifier against overvoltage transient spikes. Resistor 77 and capacitor 78 comprise a *dv/dt* slowdown circuit for the controlled rectifier. The aforementioned capacitor 58 is used to reduce the radio frequency noise voltage sensitivity of the complementary pair of transistors 54 and 64. With respect to the controlled rectifier the terms "gated-on" and rendered "-conductive" are used synonymously.

The aforedescribed on-delay time-delay apparatus is especially suitable for use with a relay known in the trade as a Westinghouse A200, in which the relay coil current required to actuate the relay may be a minimum of 1.2 amperes. Before the controlled rectifier generally designated 70 is gated-on, a current of the order of 6 milliamperes may flow through coil 15 to supply an input to the full-wave rectifier and thereby supply a regulated full-wave rectified voltage on lead 10 and current to the timing capacitor 31 and gate current to control element 71.

The foregoing written description and drawing are illustrative and exemplary only and are not to be interpreted in a limiting sense.

I claim as my invention:

1. On delay time delay apparatus comprising, in combination, first lead means adapted to be connected to one side of a single phase alternating current line, second lead means adapted to be connected to the other side of said single phase alternating current line, a full-wave rectifier having one input terminal thereof directly connected to the second lead means, the full-wave rectifier being adapted to have the other input terminal thereof connected by way of a relay coil to the first lead means, a normally nonconductive controlled rectifier having the anode-cathode path thereof connected across the output leads of the full-wave rectifier and while conductive providing a closed switch whereby sufficient current from the alternating current line flows through the relay coil to actuate the relay, a small current insufficient to actuate the relay flowing through the relay coil before the controlled rectifier is gated-on, an R-C timing circuit including in series a first resistor, a timing capacitor and an adjustable timing resistor connected across the output of the full-wave rectifier, a trigger circuit including a pair of complementary NPN and PNP transistors, each of the transistors having a base, emitter and collector, the base of the PNP transistor being connected to the junction between the timing capacitor and the timing resistor and to the collector of the NPN transistor and the collector of the PNP transistor being connected to the base of the NPN transistor and by a resistance to the cathode of the controlled rectifier, the emitter of the NPN transistor being connected to the control element of the controlled rectifier to supply a gating signal thereto when the complementary transistors are conductive, the threshold level at which the complementary transistors become conductive being established by threshold level determining circuit means including in series a first Zener diode, a first diode rectifier, the emitter-base junction of the PNP transistor and a second resistor connected from the junction between the first Zener diode and the first diode rectifier to the cathode of said controlled rectifier, the last named circuit means being connected in parallel with the timing capacitor, said timing capacitor being normally discharged at the connecting moment when the first lead means and the second lead means are first connected to the alternating current line whereby the complementary transistors are nonconductive and no gate signal is supplied to the controlled rectifier thereby providing that the controlled rectifier is nonconductive, the connection of the first lead means and second lead means to the single phase alternating current line causing a small current to flow through the relay coil and the second lead means into the full-wave rectifier and to develop a full-wave rectified direct current output voltage thereacross, said full-wave rectified output current flowing through the first resistor and starting to flow into said timing capacitor, said timing capacitor after a preselected time interval being charged to a sufficient voltage to equal the threshold voltage as determined by the threshold level determining circuit means and causing the complementary transistors to conduct thereby causing the trigger circuit to supply a gating signal to the controlled rectifier, the gating signal causing the controlled rectifier to assume a conductive condition thereby causing a relay-actuating current to flow through the relay coil, resistance circuit means including third and fourth resistors both having one end thereof operatively connected to the first lead means, said third resistor having the other end thereof operatively connected to the anode of the controlled rectifier, said fourth resistor having the other end thereof operatively connected to the cathode of the controlled rectifier, said resistance circuit means obtaining a pulsating direct current with a substantially 90 electrical degree phase difference with respect to the current in the relay coil and applying said pulsating direct current to the controlled rectifier whereby current through the controlled rectifier never decreases below its holding current and the controlled rectifier is maintained in a conductive condition with full actuating current through the relay coil until the electrical circuit is broken at the first and second lead means.

2. On delay time delay apparatus according to claim 1 including in addition a second Zener diode connected in shunt with that portion of the R-C timing circuit consisting of the timing capacitor and the timing resistor, the second Zener diode clamping the voltage across the timing capacitor and timing resistor at a predetermined value thereby providing a charging voltage substantially independent of fluctuations in the output voltage of the full-wave rectifier.

3. On delay time delay apparatus according to claim 1 including in addition a fifth resistor and a second capacitor connected in series across the output of the full-wave rectifier to filter the full rectified output therefrom.

4. On delay time delay apparatus according to claim 1 including in addition a further Zener diode connected across the anode-cathode path of the controlled rectifier to protect the controlled-rectifier from voltage transients.

5. Apparatus according to claim 1 in which the full-wave rectifier is additionally characterized as having a positive output lead and a negative output lead, a fifth resistor connected in series between the fourth resistor and the negative lead of the full-wave rectifier, said negative lead being connected to the cathode of the controlled rectifier, a second diode having the anode thereof connected to the junction between the fourth and fifth resistors and having the cathode thereof connected to the junction between the timing capacitor and the timing resistor, and a third diode and a sixth resistor connecting the other terminal of the timing capacitor to said positive output lead of the full-wave rectifier whereby when the controlled rectifier is gated-on a current path for quickly discharging the timing capacitor is provided through the controlled rectifier, said last-named current path from one terminal of the charging capacitor to the controlled rectifier including the third diode and sixth resistor, said last-named current path from the charging capacitor to the controlled rectifier including said second diode and said fifth resistor.

6. On delay time delay apparatus according to claim 1 including circuit means for resetting the circuit to its initial condition if the alternating current line voltage is interrupted prior to the completion of the timing operation, the circuit means including a second diode having its anode connected to the fourth resistor and its cathode connected to the junction between the timing capacitor and the timing resistor, and a third diode and a fifth resistor in series therewith connected across the first resistor, said quick discharging current path including the first resistor, the third diode and fifth resistor, the third resistor, the fourth resistor and the second diode.

7. On delay time delay apparatus according to claim 5 in which a pulsating direct current voltage applied across said fifth resistor causes positive pulses to be applied to the anode of the second diode having the cathode thereof connected to the junction between the timing capacitor and the timing resistor thereby causing discharging pulses to be applied to the timing capacitor with the result that the timing capacitor resets much closer to zero voltage.

8. On delay time delay apparatus according to claim 5 in which said second diode provides a current path which shorts the timing resistor during the resetting process.

9. Apparatus according to claim 3 in which the filter capacitor across the output of the full-wave rectifier has a value selected whereby the last-named capacitor also serves as a *dv/dt* suppressor capacitor.

10. In on delay time delay apparatus of the type in which first and second leads are adapted to be connected to a single phase alternating current line to initiate a timing operation, in which a full-wave rectifier is adapted to have the input thereof connected between leads, by way of a relay coil, said full-wave rectifier having the anode and cathode of a controlled rectifier connected across the output of the full-wave rectifier, full relay coil current flowing therethrough when the controlled rectifier connected across the output terminals of the full-wave rectifier is gated-on, the improvement which comprises a time delay trigger circuit not requiring a well regulated direct current supply interposed between the output of the full-wave rectifier and the control element of the controlled rectifier, said trigger circuit including a timing capacitor and timing resistor, and Zener diode means operatively connected to the full-wave rectifier for providing a clamped voltage for application to the timing capacitor, said clamped voltage being a voltage substantially less than the peak output voltage of the full-wave rectifier whereby the clamped voltage is substantially unaffected by variations in the output of the full-wave rectifier, the trigger circuit including a complementary pair of transistors switched on when the voltage on the timing capacitor is equal to a predetermined threshold value determined in part by the voltage drop across the emitter-base junction of one transistor of the pair of transistors, the trigger circuit interconnecting the timing capacitor to the controlled rectifier to supply a gating signal to the controlled rectifier to fire the controlled rectifier a predetermined time interval after the on delay time delay apparatus is connected to an alternating current line.

11. On delay time delay apparatus according to claim 2 including in addition filter means for the full-wave rectifier, circuit means for diverting the current which flows through the second Zener diode which clamps the charging voltage for the timing capacitor at a predetermined value during the timing operation thereafter into the control element of the controlled rectifier to thereby reduce the current drain on the filter of the full-wave rectifier required to supply gating current for the controlled rectifier.

12. On delay time delay apparatus according to claim 1 including an additional capacitor connected from the base of the PNP transistor to the junction between the first diode and the first Zener diode for reducing the high frequency noise voltage sensitivity of said complementary pair of transistors.